(12) United States Patent
Herhut et al.

(10) Patent No.: US 9,507,714 B2
(45) Date of Patent: Nov. 29, 2016

(54) MANAGED RUNTIME EXTENSIONS TO REDUCE POWER CONSUMPTION IN DEVICES WITH HYBRID MEMORY

(71) Applicant: Intel Corporation, Santa Clara, CA (US)

(72) Inventors: Stephan A. Herhut, Santa Clara, CA (US); Richard L. Hudson, Florence, MA (US); Tatiana Shpeisman, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 14/227,432

(22) Filed: Mar. 27, 2014

(65) Prior Publication Data
US 2015/0279464 A1 Oct. 1, 2015

(51) Int. Cl.
*G06F 12/02* (2006.01)

(52) U.S. Cl.
CPC ....... *G06F 12/0276* (2013.01); *G06F 12/0238* (2013.01); *G06F 2212/1028* (2013.01); *G06F 2212/1041* (2013.01); *G06F 2212/205* (2013.01); *G06F 2212/7202* (2013.01); *G06F 2212/7205* (2013.01); *Y02B 60/1225* (2013.01)

(58) Field of Classification Search
CPC .... G06F 3/0685; G06F 3/061; G06F 3/0649; G06F 3/0679
USPC .......................................... 711/170, 103, 105
See application file for complete search history.

(56) References Cited

U.S. PATENT DOCUMENTS

| | | | |
|---|---|---|---|
| 9,361,222 B2* | 6/2016 | Fitzpatrick | G06F 12/0246 |
| 2014/0013045 A1* | 1/2014 | Crossland | G06F 12/0866 711/105 |
| 2014/0101370 A1* | 4/2014 | Chu | G06F 12/06 711/103 |
| 2015/0106582 A1* | 4/2015 | Mai | G06F 3/0649 711/165 |
| 2015/0143034 A1* | 5/2015 | Chinnaswamy | G06F 12/08 711/103 |
| 2015/0199126 A1* | 7/2015 | Jayasena | G06F 3/061 711/103 |

FOREIGN PATENT DOCUMENTS

WO    WO 2008131058 A2 * 10/2008 ......... G06F 12/0638

OTHER PUBLICATIONS

Hong, Seongcheol, "NAND Flash-based Disk Cache Using SLC/MLC Combined Flash Memory," SNAPI 2010, 25pgs.*

* cited by examiner

*Primary Examiner* — Pierre-Michel Bataille
(74) *Attorney, Agent, or Firm* — Jordan IP Law, LLC

(57) ABSTRACT

Systems and methods may provide for identifying an object in a managed runtime environment and determining an age of the object at a software level of the managed runtime environment. Additionally, the object may be selectively allocated in one of a dynamic random access memory (DRAM) or a non-volatile random access memory (NVRAM) based at least in part on the age of the object. In one example, the data type of the object is also determined, wherein the object is selectively allocated further based on the data type.

20 Claims, 5 Drawing Sheets

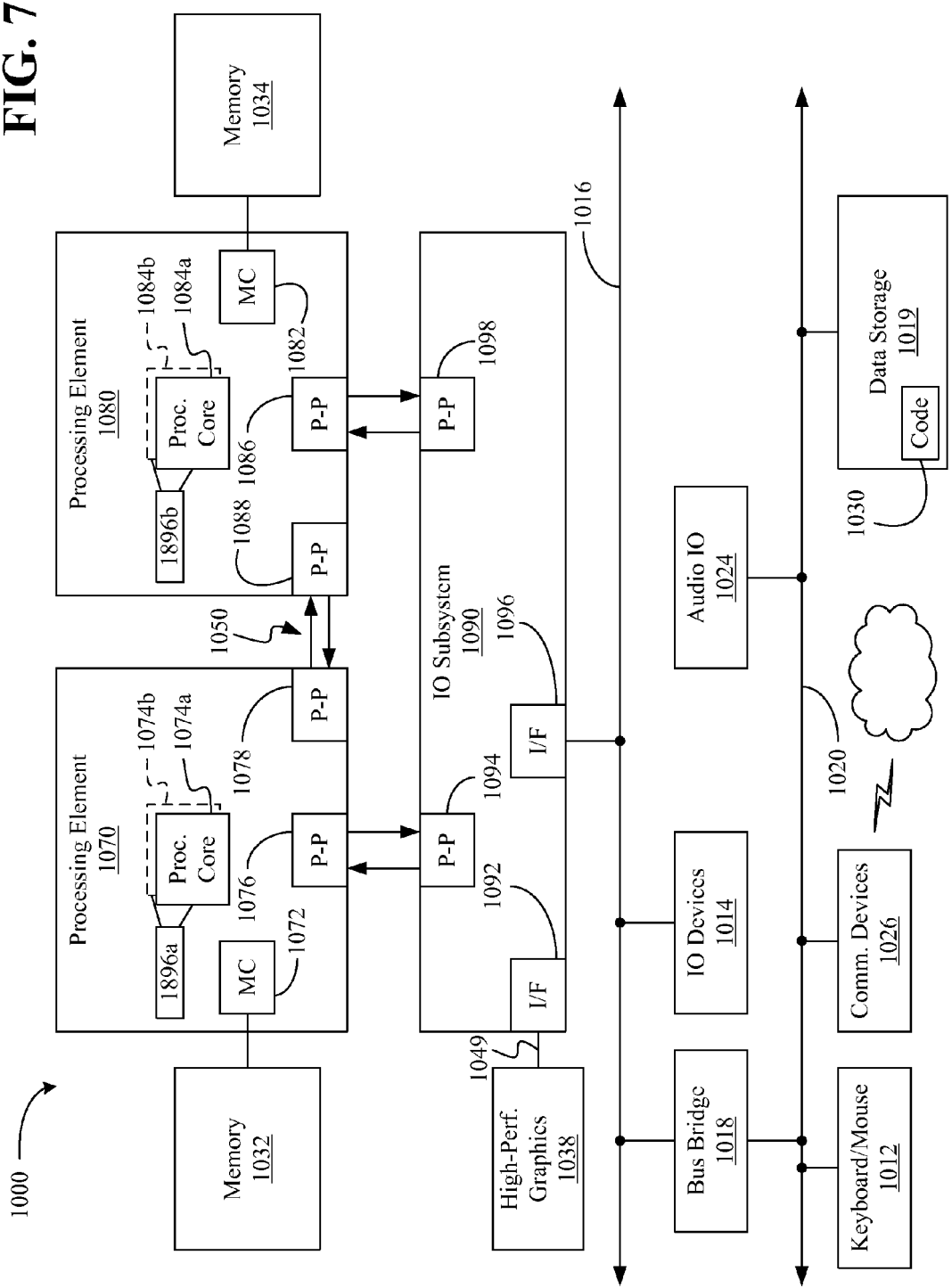

MANAGED RUNTIME EXTENSIONS TO REDUCE POWER CONSUMPTION IN DEVICES WITH HYBRID MEMORY

TECHNICAL FIELD

Embodiments generally relate to data allocation in devices with hybrid memory. More particularly, embodiments relate to the use of software level information to selectively allocate data between dynamic random access memory (DRAM) and non-volatile random access memory (NVRAM) in managed runtime environments.

BACKGROUND

Modern computing devices, such as mobile phones, may have substantial energy consumption restrictions due to battery life and overheating concerns. While dynamic random access memory (DRAM) structures within such devices may provide relatively good read/write performance, DRAM standby power may be relatively high. Non-volatile random access memory (NVRAM) structures, on the other hand, may have lower standby power than DRAM structures, but NVRAM write performance may be relatively poor. Recent developments in computing device design may employ a hybrid memory architecture that includes a small amount of DRAM and a larger amount of NVRAM, wherein specialized hardware may attempt to store heavily written data in the DRAM and store rarely accessed data in the NVRAM. For example, the specialized hardware might include a memory management unit (MMU) that observes address traffic at the processor instruction level in order to distinguish between heavily written data and rarely accessed data. Such a hardware based approach may increase cost, risk and time to market (TTM).

BRIEF DESCRIPTION OF THE DRAWINGS

The various advantages of the embodiments will become apparent to one skilled in the art by reading the following specification and appended claims, and by referencing the following drawings, in which:

FIG. 7 is a block diagram of an example of a system according to an embodiment.

DESCRIPTION OF EMBODIMENTS

Figure 1:
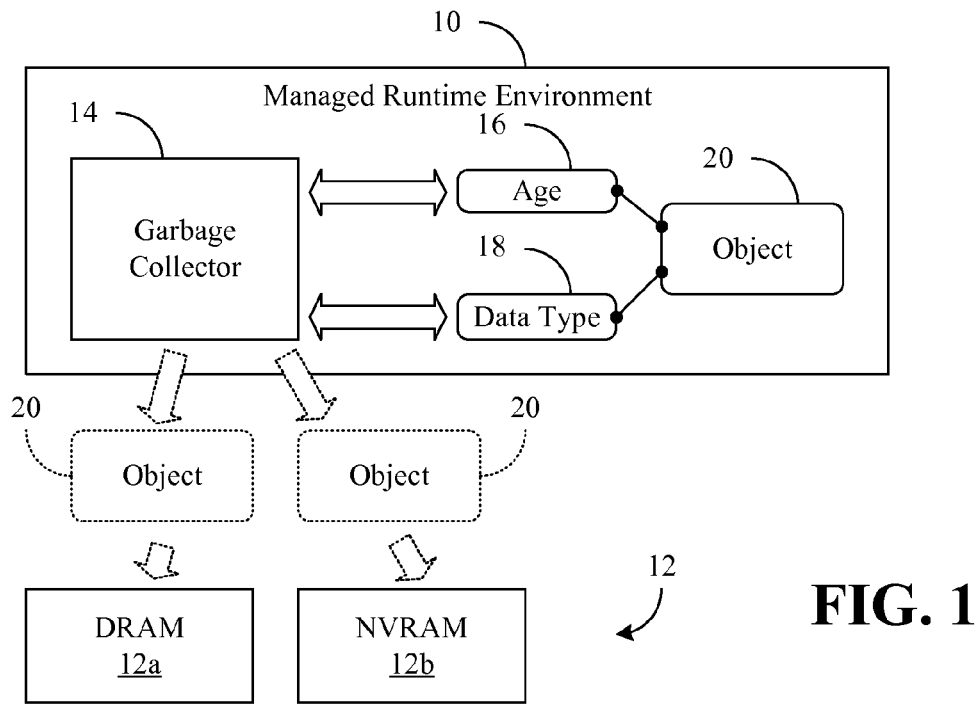
FIG. 1 is a block diagram of an example of a managed runtime environment according to an embodiment.

Turning now to FIG. 1, a managed runtime environment 10 is shown, wherein the managed runtime environment 10 operates in the presence of a hybrid memory architecture 12 (12a, 12b) including, for example, a dynamic random access memory (DRAM) 12a, a non-volatile random access memory (NVRAM) 12b, and so forth. The DRAM 12a may generally be suitable for storage of data that is frequently accessed, whereas the NVRAM 12b may generally be more suitable for storage of data that is less frequently accessed.

The managed runtime environment 10 may be a high level software solution such as, for example, HTML5 (Hypertext Markup Language 5, e.g., HTML5 Editor's Draft 8 May 2012, W3C), Dalvik (Android Open Handset Alliance/OHA), ART (Android Runtime, OHA), C# (e.g., C#5.0, MICROSOFT Corp., Aug. 15, 2012), .NET (e.g., .NET Framework 4.5, MICROSOFT Corp., Oct. 17, 2013), Ruby (e.g., Ruby 2.1.0, Y. Matsumoto, Dec. 25, 2013), Perl (e.g., Perl 5.18.2, Perl.org, Jan. 7, 2014), Python (e.g., Python 3.3.3, Python Software Foundation, Nov. 19, 2013), JAVA (e.g., JAVA Standard Edition 7 Update 51, ORACLE Corp., Jan. 14, 2014), etc., or other virtual machine (VM) that provides runtime compilation as an additional level of abstraction between the application layer and the operating system (OS, not shown) running beneath the managed runtime environment 10. As will be discussed in greater detail, the managed runtime environment 10 may provide high level information regarding data to be stored in the hybrid memory architecture 12, wherein that information may be in turn used to substantially reduce power consumption.

For example, the illustrated managed runtime environment 10 includes a garbage collector 14 that generally manages the allocation, including allocations related to moving objects from a nursery to mature space, and release of memory for an application. More particularly, the garbage collector 14 may determine the age 16 (e.g., number of execution cycles, amount of time, etc.) and/or data type 18 (e.g., code location where object is first allocated, programming language types (class, prototype, struct type, array, etc.), other object characteristics such as references to and from the object, document object model/DOM object, image, dictionary, counter, result of network communication, etc.) of an object 20 being operated on during execution of a program. The garbage collector 14 may also have managed runtime extension functionality that selectively allocates the object 20 in either the DRAM 12a or the NVRAM 12b based on the age 16 and/or data type 18 of the object 20. Thus, if the age 16 and/or data type 18 indicate that the object 20 has a relatively high likelihood of being accessed during execution, the garbage collector 14 might allocate the object 20 in the DRAM 12a in order to achieve optimal performance.

If, on the other hand, the age 16 and/or data type 18 indicate that the object 20 has a relatively low likelihood of being accessed during execution, the illustrated garbage collector 14 may allocate the object 20 in the NVRAM 12b. Such an approach may take advantage of the reduced standby power of the NVRAM 12b without giving rise to concerns over write performance degradation because the data in the NVRAM 12b has a low access likelihood.

Figure 2A:
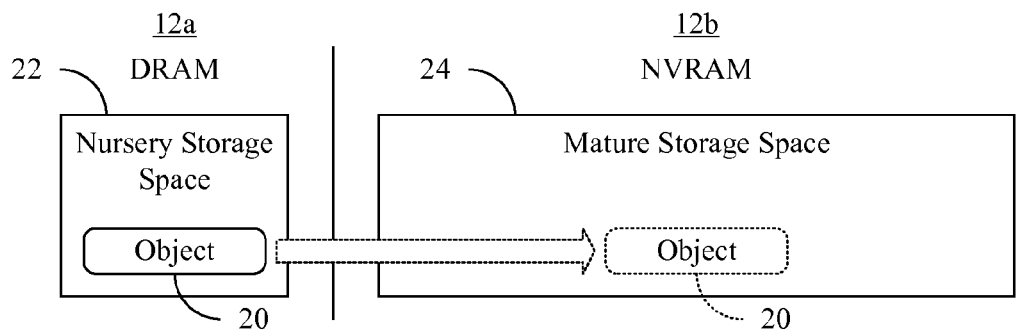
FIGS. 2A and 2B are block diagrams of examples of hybrid memory architectures according to embodiments.

FIG. 2A shows one example of a hybrid memory architecture in which a nursery storage space 22 is maintained in the DRAM 12a and a mature storage space 24 is maintained in the NVRAM 12b. In the illustrated example, the object 20 is originally allocated (e.g., based on age) in the nursery storage space 22 of the DRAM 12a. When it is determined that the object 20 is still live (e.g., reachable by the program sequence in the managed runtime environment) but no longer likely to be accessed by the program being executed (e.g., based on age and/or data type), the object 20 may be moved (e.g., reallocated) from the nursery storage space 22 of the DRAM 12a to the mature storage space 24 of the NVRAM 12b. As already noted, allocating the object 20 in the NVRAM 12b may reduce power consumption.

Figure 2B:
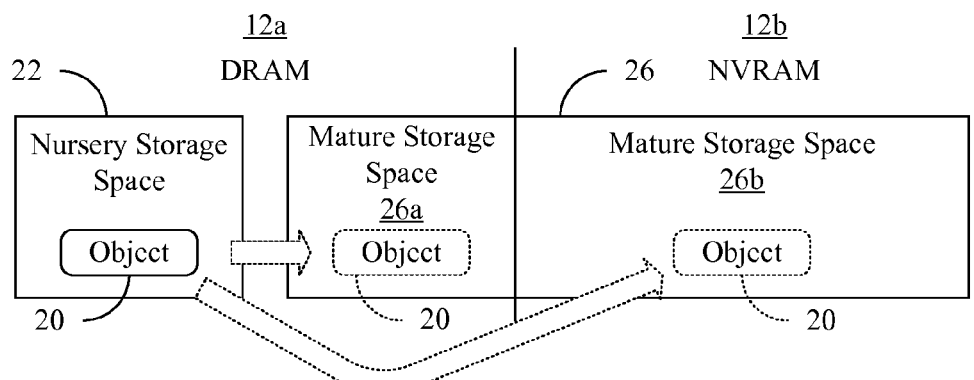

FIG. 2B shows another example of a hybrid memory architecture in which the nursery storage space 22 is maintained in the DRAM 12a and a mature storage space 26 (26a, 26b) is maintained across the DRAM 12a and the NVRAM 12b. More particularly, a first portion 26a of the mature storage space 26 may be maintained in the DRAM 12a and a second portion 26b of the mature storage space 26 may be maintained in the NVRAM 12b. As in the above example, the object 20 may be originally allocated (e.g., based on age) in the nursery storage space 22 of the DRAM 12a. When it is determined that the object 20 is still live but no longer new, the object 20 may be moved from the nursery storage space 22 of the DRAM 12a to either the first portion 26a of the mature storage space 26 in the DRAM 12a or the second portion 26b of the mature storage space 26 in the NVRAM 12b.

More particularly, the object 20 may be moved to the first portion 26a of the mature storage space 26 if the age of the object 20 exceeds a generational threshold (e.g., predetermined number of execution cycles, amount of time, etc.) but the data type of the object 20 corresponds to a data type that has a relatively high write access likelihood (e.g., a first data type that is "DVRAM friendly"). An example of such a data type might be a counter that is modified often and has a long life. Other data types may also be good candidates for remaining in the DRAM 12a for relatively long periods of time. Indeed, depending upon the circumstances, a wide variety of heuristics may be used to optimize power consumption in the computing system. Moreover, the managed runtime environment may monitor the appropriate performance counters and/or write barriers of the system and notify (e.g., via object type table updates/modifications) garbage collection components of the heuristic status in real-time. Accordingly, the illustrated approach may enable a purely age-based solution to be overridden with knowledge about the semantic meaning of the object 20.

The object 20 may be moved to the second portion 26b of the mature storage space 26, on the other hand, if the age of the object 20 exceeds the generational threshold or the data type of the object 20 corresponds to a data type that has a relatively low write access likelihood (e.g., a second data type that is "NVRAM friendly"). Thus, as certain types of live objects reach a certain age, they may be moved to the NVRAM 12b to reduce power consumption and/or extend battery life, without negatively impacting performance.

Figure 3:
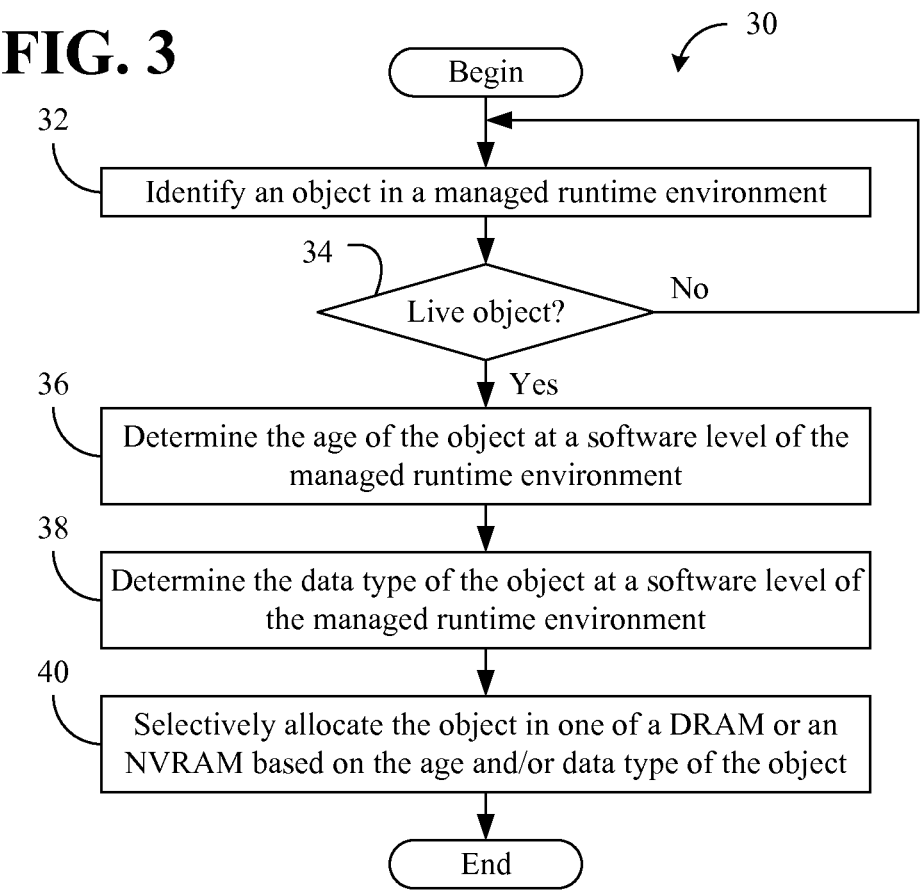
FIG. 3 is a flowchart of an example of a method of allocating objects in a hybrid memory architecture according to an embodiment.

Turning now to FIG. 3, a method 30 of allocating objects in a hybrid memory architecture is shown. The method 30 may be implemented as an extension module in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 30 may be written in any combination of one or more programming languages, including an object oriented programming language such as C#, Dalvik, DART, EcmaScript, .NET, Ruby, Pearl, Python, JAVA or the like.

Illustrated processing block 32 provides for identifying an object in a managed runtime environment, wherein one or more program pointers that write access objects may be used to identify the object in question. Additionally, a determination may be made at block 34 as to whether the object is live. An object may be considered live if it is reachable in the managed runtime environment. Thus, for example, if the program can no longer reach an object either directly or transitively through other objects the object may be designated as not live and the illustrated method 30 will identify another object. If the object is live, however, the age of the object may be determined at block 36. In the illustrated example, the age is determined at a software level of the managed runtime environment. The data type of the object may also be determined at the software level in block 38. In this regard, the managed runtime environment may provide semantic information that is difficult and/or costly to determine via purely hardware based solutions. Accordingly, determining the age and data type at the software level as shown may enable a substantial reduction of risk and/or time to market (TTM). Illustrated block 40 may selectively allocate the object in one of a DRAM or an NVRAM based on the age and/or data type of the object.

Figure 4A:
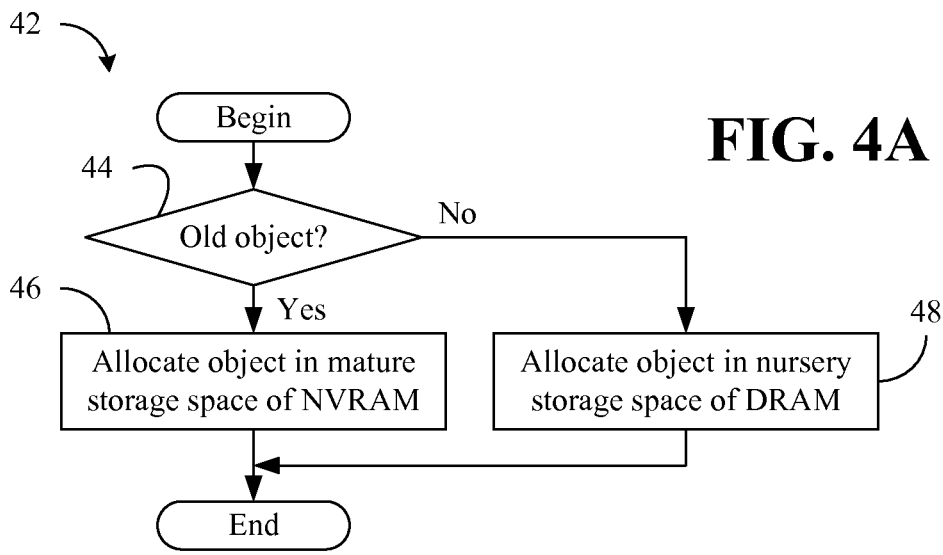
FIGS. 4A and 4B are flowcharts of examples of methods of using nursery storage space and mature storage space to allocate objects in a hybrid memory architecture according to an embodiment.

Turning now to FIG. 4A, a method 42 of using nursery storage space and mature storage space to allocate objects in a hybrid memory architecture is shown. The method 42 may be readily substituted for the processing block 40 (FIG. 3), already discussed. A determination may be made at block 44 as to whether the age of an identified object exceeds a generational threshold (e.g., the object is "old"). If so, the object may be allocated in a mature storage space of an NVRAM at block 46. Otherwise, the object may be allocated in a nursery storage space of a DRAM at block 48. The illustrated approach therefore employs a primarily generational based heuristic solution in which the majority of write operations hit data stored in the DRAM. Furthermore, as the nursery storage space may be small compared to the mature storage space, the nursery storage space may fit well into the DRAM, which may also be relatively small. Moreover, the amount of live data to be moved/copied from the nursery storage space to the mature storage space may be small, which may be an underlying assumption of generational garbage collectors in general. Due to the reduced number of write accesses to the NVRAM, the illustrated method 42 enables standby power benefits to be exploited without incurring the performance and energy overhead of NVRAM read/write operations. Table I below provides a summary of the illustrated approach.

TABLE I

| Age | | Allocation Target |
|---|---|---|
| | New | $DRAM_{nursery}$ |
| | Old | $NVRAM_{mature}$ |

Figure 4B:
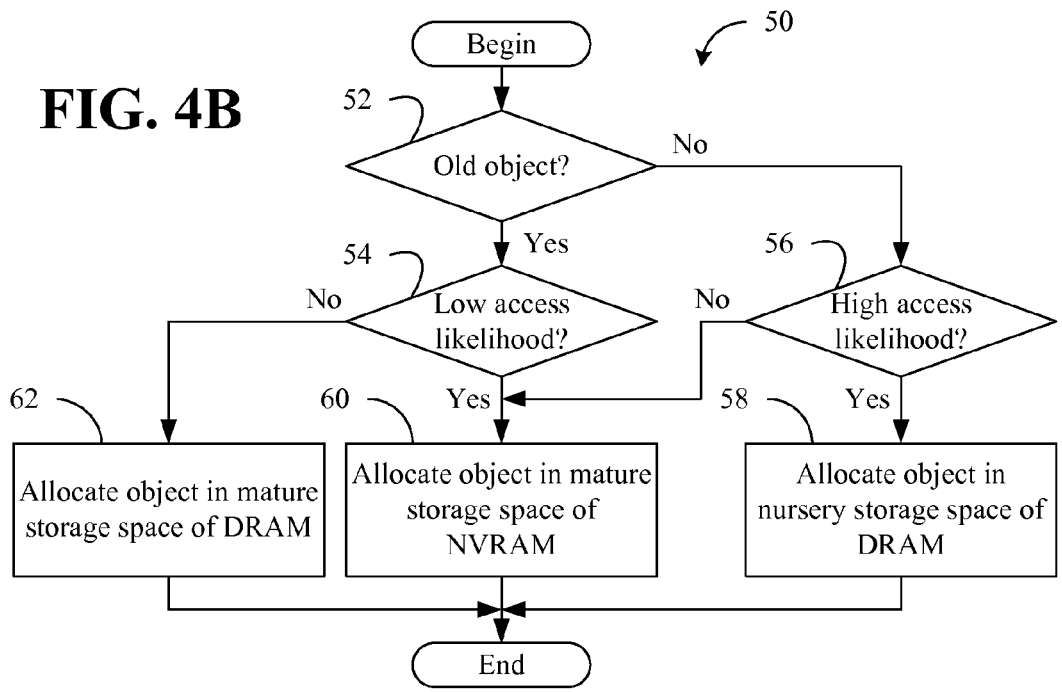

FIG. 4B shows an alternative method 50 of using nursery storage space and mature storage space to allocate objects in a hybrid memory architecture. The method 50 may be readily substituted for the processing block 40 (FIG. 3), already discussed. A determination may be made at block 52 as to whether the age of an identified object exceeds a generational threshold (e.g., the object is "old"). If not, illustrated block 56 determines whether the data type of the object has a high write access likelihood (e.g., data type corresponds to a first data type). If the data type of the object has a high write access likelihood, the object may be allocated in a nursery storage space of the DRAM at block 58. Thus, new objects that are likely to be write accessed (e.g., written, stored) are placed in DRAM in the illustrated example. Alternatively, the determination at block 56 may be bypassed so that all new objects are originally placed in DRAM.

If, on the other hand, it is determined at block 56 that the data type of the object does not have a high write access likelihood (e.g., data type corresponds to a second data type, wherein the first data type has a greater write access likelihood than the second data type), the object may be allocated in a mature storage space of the NVRAM at block 60. Similarly, if it is determined at block 54 that the data type of the object has a low write access likelihood, the object may be allocated in the mature storage space of the NVRAM at block 60. Thus, objects that are not likely to be write accessed are placed in NVRAM in the illustrated example.

If it is determined at block 54 that the data type of the object does not have a low write access likelihood (but the object is relatively old), illustrated block 62 allocates the object in a mature storage space of the DRAM. Block 62 may alternatively allocate the object in a fresh nursery. Thus, old objects that are likely to be write accessed are placed in DRAM in the illustrated example. As already noted, the write access likelihood determinations at blocks 54 and 56 may involve comparing the object data type to one or more object type tables that may be maintained in real-time by the managed runtime environment based on the status of performance counter, write barriers, heuristics, and so forth. Table II below provides a summary of the illustrated approach.

TABLE II

|  |  | Write access Likelihood | |
|---|---|---|---|
|  |  | High | Low |
| Age | New | $DRAM_{nursery}$ | $NVRAM_{mature}$ |
|  | Old | $DRAM_{mature}$ | $NVRAM_{mature}$ |

Figure 5:
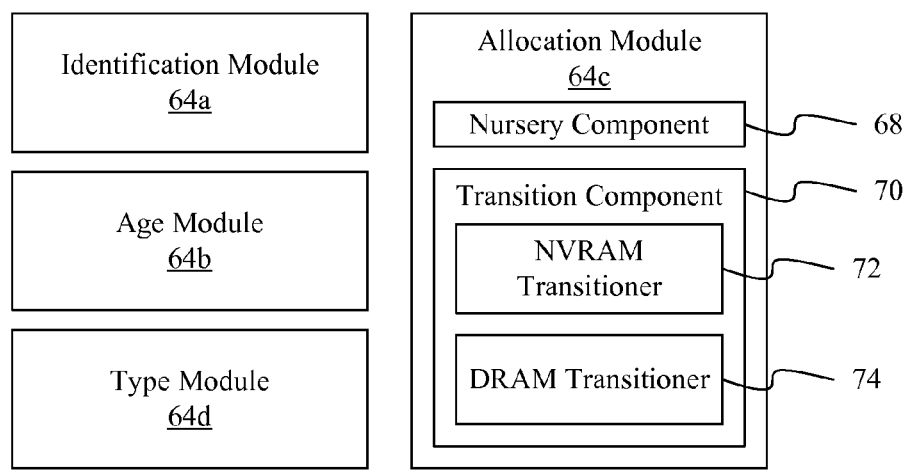
FIG. 5 is a block diagram of an example of a logic architecture according to an embodiment.

Turning now to FIG. 5, a garbage collector logic architecture 64 (64a-64d) is shown. The illustrated architecture 64, which may be readily substituted for the garbage collector 14 (FIG. 1), may also implement one or more aspects of the method 30 (FIG. 3), already discussed. The architecture 64 may include an identification module 64a to identify objects in a managed runtime environment and an age module 64b to determine an age of the objects at a software level of the managed runtime environment. The illustrated architecture 64 also includes an allocation module 64c to selectively allocate the objects in one of a DRAM or an NVRAM based at least in part on the age of the objects. In one example, the allocation module 64c includes a nursery component 68 to allocate the objects in a nursery storage space of the DRAM if the age does not exceed a generational threshold, and a transition component 70 to allocate the objects in a mature storage space of the NVRAM if the age of the objects does not exceed the generational threshold.

The architecture 64 may also include a type module 64d to determine a data type of the objects, wherein the objects are to be selectively allocated further based on the data type. For example, the nursery component 68 might allocate the objects in the nursery storage space of the DRAM if the age of the objects does not exceed a generational threshold and the data type corresponds to a DRAM friendly data type. Additionally, the transition component 70 may have an NVRAM transitioner 72 to allocate the objects in the mature storage space of the NVRAM if the age of the objects exceeds the generational threshold or the data type corresponds to an NVRAM friendly data type having a lesser write access likelihood than the DRAM friendly data type. A DRAM transitioner 74, on the other hand, may allocate the objects in one of a mature storage space of the DRAM or a fresh nursery of the DRAM if the age of the object exceeds the generational threshold and the data type corresponds to the first data type. The allocation module 64c may selectively allocate the objects further based on whether the objects are reachable in the managed runtime environment.

Figure 6:
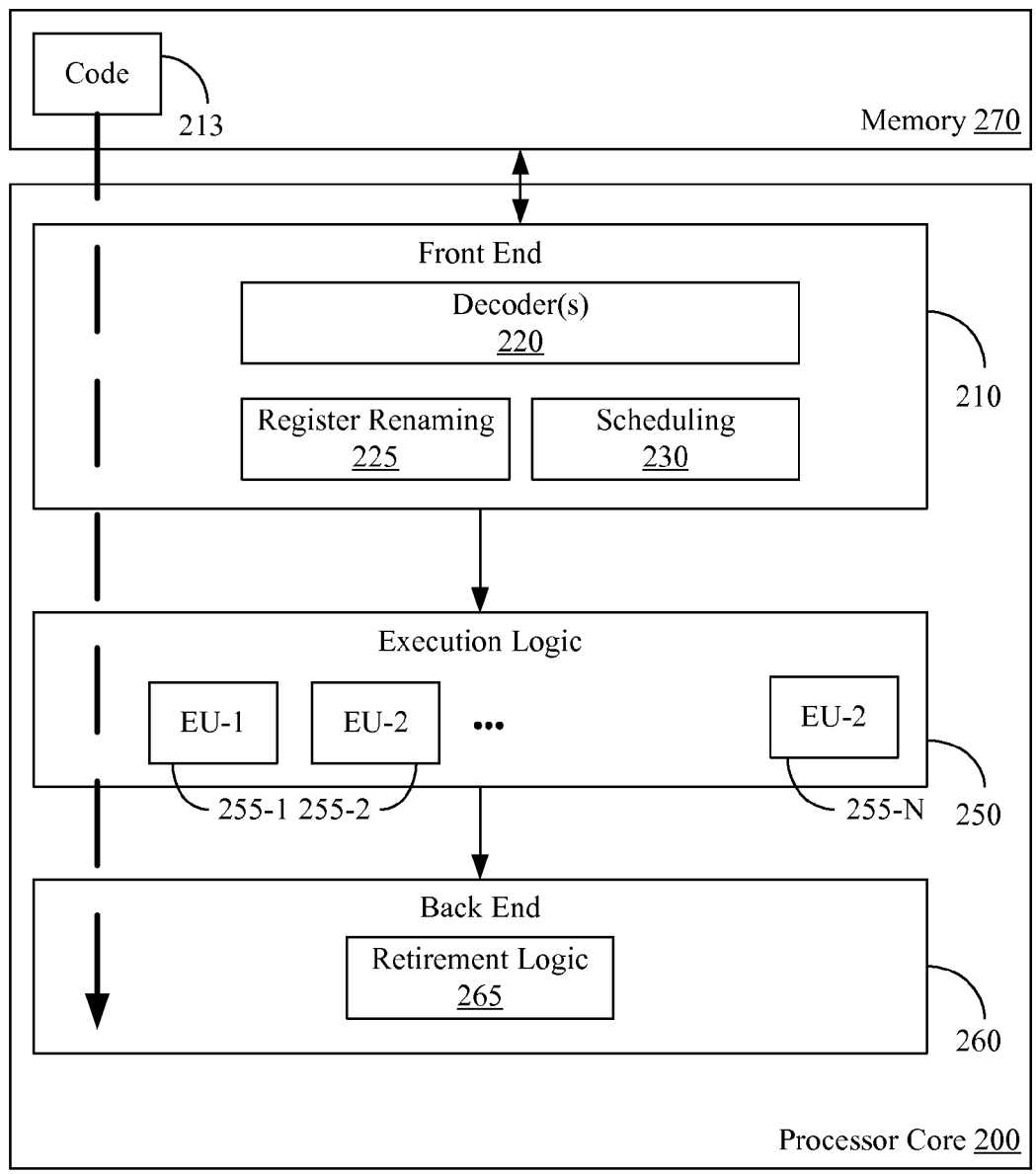
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 30 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 7, shown is a block diagram of a system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. The memory 1032 and 1034 may represent a hybrid memory architecture that includes both DRAM and NVRAM. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 30 (FIG. 3), already discussed, and may be similar to the code 213 (FIG. 6), already discussed. Further, an audio I/O 1024 may be coupled to second bus 1020.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

Additional Notes and Examples

Example 1 may include a system to operate a managed runtime environment, comprising a dynamic random access memory (DRAM), a non-volatile random access memory (NVRAM), an identification module to identify an object in the managed runtime environment, an age module to determine an age of the object at a software level of the managed runtime environment, and an allocation module to selectively allocate the object in one of the DRAM or the NVRAM based at least in part on the age of the object.

Example 2 may include the system of Example 1, wherein the allocation module includes a nursery component to allocate the object in a nursery storage space of the DRAM if the age does not exceed a generational threshold, and a transition component to allocate the object in a mature storage space of the NVRAM if the age of the object exceeds the generational threshold.

Example 3 may include the system of Example 1, further including a type module to determine a data type of the object, wherein the object is to be selectively allocated further based on the data type.

Example 4 may include the system of Example 3, wherein the allocation module includes a nursery component to allocate the object in a nursery storage space of the DRAM if the age of the object does not exceed a generational threshold and the data type corresponds to a first data type, a transition component having, an NVRAM transitioner to allocate the object in a mature storage space of the NVRAM if the age of the object exceeds the generational threshold or the data type corresponds to a second data type, and a DRAM transitioner to allocate the object in one of a mature storage space of the DRAM or a fresh nursery of the DRAM if the age of the object exceeds the generational threshold and the data type corresponds to the first data type.

Example 5 may include the system of Example 4, wherein the first data type is to have a greater access likelihood than the second data type.

Example 6 may include the system of any one of Examples 1 to 5, wherein the allocation module is to selectively allocate the object further based on whether the object is reachable in the managed runtime environment.

Example 7 may include a method of allocating objects, comprising identifying an object in a managed runtime environment, determining an age of the object at a software level of the managed runtime environment, and selectively allocating the object in one of a dynamic random access memory (DRAM) or a non-volatile random access memory (NVRAM) based at least in part on the age of the object.

Example 8 may include the method of Example 7, wherein selectively allocating the object includes allocating the object in a nursery storage space of the DRAM if the age does not exceed a generational threshold, and allocating the object in a mature storage space of the NVRAM if the age of the object exceeds the generational threshold.

Example 9 may include the method of Example 7, further including determining a data type of the object, wherein the object is selectively allocated further based on the data type.

Example 10 the method of Example 9, wherein selectively allocating the object includes allocating the object in a nursery storage space of the DRAM if the age of the object does not exceed a generational threshold and the data type corresponds to a first data type, allocating the object in a mature storage space of the NVRAM if the age of the object exceeds the generational threshold or the data type corresponds to a second data type, and allocating the object in one of a mature storage space of the DRAM or a fresh nursery of the DRAM if the age of the object exceeds the generational threshold and the data type corresponds to the first data type.

Example 11 may include the method of Example 10, wherein the first data type has a greater access likelihood than the second data type Example 12 may include the method of any one of Examples 7 to 11, wherein the object is selectively allocated further based on whether the object is reachable in the managed runtime environment.

Example 13 may include at least one computer readable storage medium comprising a set of instructions which, when executed by a computing device, cause the computing device to identify an object in a managed runtime environment, determine an age of the object at a software level of the managed runtime environment, and selectively allocating the object in one of a dynamic random access memory (DRAM) or a non-volatile random access memory (NVRAM) based at least in part on the age of the object.

Example 14 may include the at least one computer readable medium of Example 13, wherein the instructions, when executed by a computing device, cause the computing device to allocate the object in a nursery storage space of the DRAM if the age does not exceed a generational threshold, and allocate the object in a mature storage space of the NVRAM if the age of the object exceeds the generational threshold.

Example 15 may include the at least one computer readable medium of Example 13, wherein the instructions, when executed by a computing device, cause the computing device to determine a data type of the object, wherein the object is to be selectively allocated further based on the data type.

Example 16 may include the at least one computer readable medium of Example 15, wherein the instructions, when executed by a computing device, cause the computing device to allocate the object in a nursery storage space of the DRAM if the age of the object does not exceed a generational threshold and the data type corresponds to a first data type, allocate the object in a mature storage space of the NVRAM if the age of the object exceeds the generational threshold or the data type corresponds to a second data type, and allocate the object in one of a mature storage space of the DRAM or a fresh nursery of the DRAM if the age of the object exceeds the generational threshold and the data type corresponds to the first data type.

Example 17 may include the at least one computer readable medium of Example 16, wherein the first data type is to have a greater access likelihood than the second data type.

Example 18 may include the at least one computer readable medium of any one of Examples 13 to 17, wherein the object is to be selectively allocated further based on whether the object is reachable in the managed runtime environment.

Example 19 may include an apparatus to allocate objects, comprising an identification module to identify an object in a managed runtime environment, an age module to determine an age of the object at a software level of the managed runtime environment, and an allocation module to selectively allocate the object in one of a dynamic random access memory (DRAM) or a non-volatile random access memory (NVRAM) based at least in part on the age of the object.

Example 20 may include the apparatus of Example 19, wherein the allocation module includes a nursery component to allocate the object in a nursery storage space of the DRAM if the age does not exceed a generational threshold, and a transition component to allocate the object in a mature storage space of the NVRAM if the age of the object exceeds the generational threshold.

Example 21 may include the apparatus of Example 19, further including a type module to determine a data type of the object, wherein the object is to be selectively allocated further based on the data type.

Example 22 may include the apparatus of Example 21, wherein the allocation module includes a nursery component to allocate the object in a nursery storage space of the DRAM if the age of the object does not exceed a generational threshold and the data type corresponds to a first data type, a transition component having an NVRAM transitioner to allocate the object in a mature storage space of the NVRAM if the age of the object exceeds the generational threshold or the data type corresponds to a second data type, an a DRAM transitioner to allocate the object in one of a mature storage space of the DRAM or a fresh nursery of the DRAM if the age of the object exceeds the generational threshold and the data type corresponds to the first data type.

Example 23 may include the apparatus of Example 22, wherein the first data type is to have a greater access likelihood than the second data type.

Example 24 may include the apparatus of any one of Examples 19 to 23, wherein the allocation module is to selectively allocate the object further based on whether the object is reachable in the managed runtime environment.

Example 25 may include an apparatus to allocate objects, comprising means for performing the method of any one of Examples 7 to 12.

Thus, techniques may enable optimization of mobile operating systems to make use of hybrid memory configurations with standard processors. Additionally, faster TTM may be achieved relative to hardware based solutions. Moreover, more available memory may be obtained at reduced power cost and longer battery life. In addition, system information regarding memory pinning and/or paging may be used to selectively activate and/or deactivate one or more techniques described herein.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A method comprising:
   identifying an object in a managed runtime environment,
   determining an age of the object at a software level of the managed runtime environment, and
   a processor selectively allocating the object in one of a dynamic random access memory (DRAM) or a non-volatile random access memory (NVRAM) based at least in part on the age of the object, wherein selectively allocating the object includes:
      allocating the object in a nursery storage space of the DRAM if the age does not exceed a generational threshold wherein the object is selectively allocated further based on whether the object is reachable in the managed runtime environment.

2. The method of claim 1, wherein selectively allocating the object includes:
   allocating the object in a mature storage space of the NVRAM if the age of the object exceeds the generational threshold.

3. The method of claim 1, further including determining a data type of the object, wherein the object is selectively allocated further based on the data type.

4. The method of claim 3, wherein selectively allocating the object includes:
   allocating the object in a mature storage space of the NVRAM if the age of the object exceeds the generational threshold or the data type corresponds to a second data type, and
   allocating the object in one of a mature storage space of the DRAM or a fresh nursery of the DRAM if the age of the object exceeds the generational threshold and the data type corresponds to the first data type.

5. The method of claim 4, wherein the first data type has a greater access likelihood than the second data type.

6. A system comprising:
   a dynamic random access memory (DRAM),
   a non-volatile random access memory (NVRAM),
   an identification module to identify an object in a managed runtime environment,
   an age module to determine an age of the object at a software level of the managed runtime environment, and
   an allocation module to selectively allocate the object in one of the DRAM or the NVRAM based at least in part on the age of the object, wherein the allocation module includes:
      a nursery component to allocate the object in a nursery storage space of the DRAM if the age does not exceed a generational threshold wherein the allocation module is to selectively allocate the object further based on whether the object is reachable in the managed runtime environment.

7. The system of claim 6, wherein the allocation module includes:
a transition component to allocate the object in a mature storage space of the NVRAM if the age of the object exceeds the generational threshold.

8. The system of claim 6, further including a type module to determine a data type of the object, wherein the object is to be selectively allocated further based on the data type.

9. The system of claim 8, wherein the allocation module includes:
a transition component having,
an NVRAM transitioner to allocate the object in a mature storage space of the NVRAM if the age of the object exceeds the generational threshold or the data type corresponds to a second data type, and
a DRAM transitioner to allocate the object in one of a mature storage space of the DRAM or a fresh nursery of the DRAM if the age of the object exceeds the generational threshold and the data type corresponds to the first data type.

10. The system of claim 9, wherein the first data type is to have a greater access likelihood than the second data type.

11. An apparatus comprising:
an identification module to identify an object in a managed runtime environment,
an age module to determine an age of the object at a software level of the managed runtime environment, and
an allocation module to selectively allocate the object in one of a dynamic random access memory (DRAM) or a non-volatile random access memory (NVRAM) based at least in part on the age of the object, wherein the allocation module includes:
a nursery component to allocate the object in a nursery storage space of the DRAM if the age does not exceed a generational threshold wherein the allocation module is to selectively allocate the object further based on whether the object is reachable in the managed runtime environment.

12. The apparatus of claim 11, wherein the allocation module includes:
a transition component to allocate the object in a mature storage space of the NVRAM if the age of the object exceeds the generational threshold.

13. The apparatus of claim 11, further including a type module to determine a data type of the object, wherein the object is to be selectively allocated further based on the data type.

14. The apparatus of claim 13, wherein the allocation module includes:
a transition component having,
an NVRAM transitioner to allocate the object in a mature storage space of the NVRAM if the age of the object exceeds the generational threshold or the data type corresponds to a second data type, and
a DRAM transitioner to allocate the object in one of a mature storage space of the DRAM or a fresh nursery of the DRAM if the age of the object exceeds the generational threshold and the data type corresponds to the first data type.

15. The apparatus of claim 14, wherein the first data type is to have a greater access likelihood than the second data type.

16. At least one computer readable storage medium comprising a set of instructions which, when executed by a computing device, cause the computing device to:
identify an object in a managed runtime environment,
determine an age of the object at a software level of the managed runtime environment, and
selectively allocate the object in one of a dynamic random access memory (DRAM) or a non-volatile random access memory (NVRAM) based at least in part on the age of the object including allocating the object in a nursery storage space of the DRAM if the age does not exceed a generational threshold wherein the object is to be selectively allocated further based on whether the object is reachable in the managed runtime environment.

17. The at least one computer readable medium of claim 16, wherein the instructions, when executed by a computing device, cause the computing device to:
allocate the object in a mature storage space of the NVRAM if the age of the object exceeds the generational threshold.

18. The at least one computer readable medium of claim 16, wherein the instructions, when executed by a computing device, cause the computing device to determine a data type of the object, wherein the object is to be selectively allocated further based on the data type.

19. The at least one computer readable medium of claim 18, wherein the instructions, when executed by a computing device, cause the computing device to:
allocate the object in a mature storage space of the NVRAM if the age of the object exceeds the generational threshold or the data type corresponds to a second data type, and
allocate the object in one of a mature storage space of the DRAM or a fresh nursery of the DRAM if the age of the object exceeds the generational threshold and the data type corresponds to the first data type.

20. The at least one computer readable medium of claim 19, wherein the first data type is to have a greater access likelihood than the second data type.

* * * * *